Patented June 8, 1937

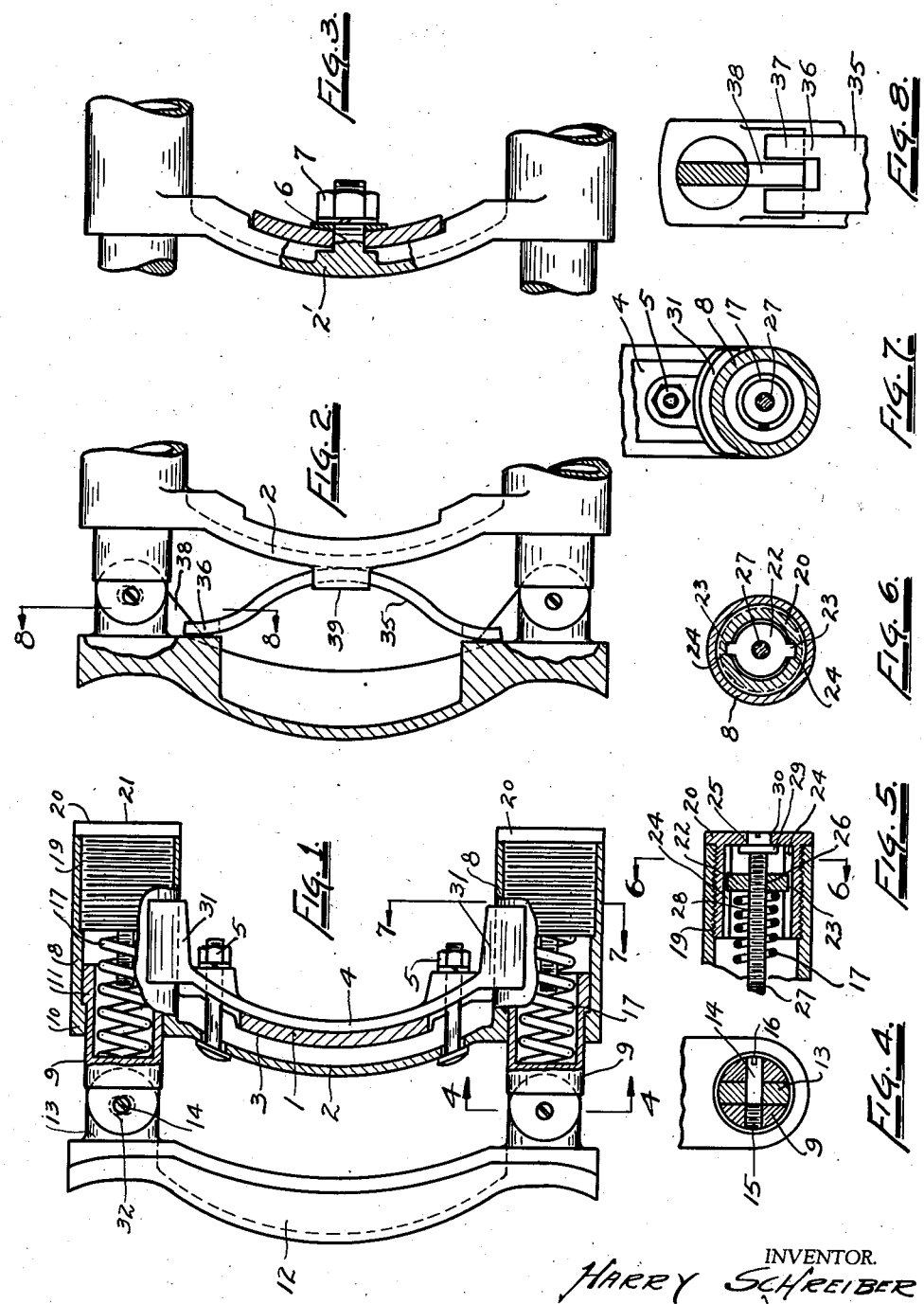

2,083,038

UNITED STATES PATENT OFFICE 2,083,038

SHOCK ABSORBING BUMPER

Harry Schreiber, Detroit, Mich.

Application June 19, 1936, Serial No. 86,086

14 Claims. (Cl. 293—55)

The present invention pertains to a novel shock absorbing bumper for automobiles. It has become customary to provide the front and rear bumpers of automobiles with bumper guards attached thereto in a vertical position. These guards receive, for the most part, the shock to which the vehicle may be subjected. The shock is entirely absorbed in a rigid system, with the result that certain parts are abused, bent or broken.

The principal object of the invention is to provide, in conjunction with the bumper guards, a means for resiliently absorbing or cushioning the shock. This object is accomplished, generally, by providing members, similar to the present bumper guards and mounting a shock bar a few inches in front of each guard. The shock bar is slidably supported by the bumper guard or an extended part thereof, and the resilient mounting for the shock bar is provided by means of either coil or leaf springs.

A further object of the invention is to mount the shock bars in such a manner that they will perform their function whether struck at either end or in the center, without seriously straining or breaking any of the parts. This object is accomplished by means of an articulated support for each shock bar at each end thereof, as will appear more fully in the detailed description.

Still another object of the invention is to enable adjustment of the absorption springs to any desired tension. In the preferred construction, the coil springs are received in cylinders, and one end of each spring is engaged by a washer which may be moved lengthwise of the cylinder by turning a screw. The movement of the washer obviously regulates the tension of the spring.

Other objects and characteristics of the invention will appear as the description proceeds.

The invention is fully disclosed by way of example in the following description and in the accompanying drawing in which Figure 1 is a side elevation of the device, partly in section;

Figure 2 is a side elevation of a modification;

Figure 3 is a side elevation, partly in section, of still another modification;

Figure 4 is a section on the line 4—4 of Figure 1;

Figure 5 is a detail section showing the spring adjustment;

Figure 6 is a section on the line 6—6 of Figure 5;

Figure 7 is a section on the line 7—7 of Figure 1, and

Figure 8 is a section on the line 8—8 of Figure 2.

Reference to these views will now be made by use of like characters that are employed to designate corresponding parts throughout.

In Figure 1 is shown a transverse automobile bumper 1 of conventional design. At suitable selected points along the bumper are mounted vertical brackets 2 attached by means presently to be described. These members preferably occupy the positions of the bumper guards now commonly in use.

Inasmuch as the units are identical, it will be necessary to describe only one of them. Each bracket 2 is positioned vertically against the outer surface of the bumper and is preferably formed with a socket 3 to receive the bumper. At the opposite inner surface of the bumper is mounted a clamping plate 4 secured to the bracket 2 by suitable fastening means generally indicated by the numeral 5. In the modification shown in Figure 3, however, the bracket 2' has a central stud 6 passing through the bumper and fitted at its free end with a nut 7.

At the upper and lower ends of the bracket 2 are formed cylinders 8 extending horizontally rearward above and beneath the bumper 1, respectively. In the forward end of each cylinder is slidably mounted a plunger 9 partly exposed outside the cylinder. The forward end of the cylinder has an internal shoulder 10 engageable at its rear side by a collar 11 on the plunger, so that the plunger cannot be forced or pulled out of the cylinder.

A vertical shock bar 12 is supported by the forward outer ends of the plungers 9. The support is made by means of ears 13 extending inwardly from the bar 12 and studs 14 passed through the ears and the adjacent plunger.

Each stud 14 has one end threaded at 15 and the other end formed with a screw driver slot 16. The stud is held by screwing its threaded end into one of the ears 13.

In each cylinder 8 is a coil spring 17 bearing against the inner end of a plunger. The spring is inserted through the tapped inner end 19 of the cylinder, and the end is then closed by a hollow and shouldered screw plug 20 having a screw driver slot 21.

For adjustment of the coil spring, a washer 22 is mounted within the plug and behind the spring. This washer has lugs 23 slidably received in slots 24 cut in the inner walls of the cylinder, to prevent the washer from turning. The face of the plug 20 has a plain hole 25, and the washer has a co-axial tapped hole 26. A stud 27 is passed through the plain hole 25 and has its threads 28 screwed in the tapped hole 26. Further, the stud has a collar 29 received between the washer 22 and the face of the screw plug and bearing against the latter. The outer end of the stud is flush with the outer face of the plug and is preferably formed with a screw-driver slot 30. Thus, on turning the stud, the washer travels in one direction or the other lengthwise of the cylinder to compress the spring or permit it to expand. The stud is preferably rather long in order to allow a wide range of adjustment.

When the bracket 2 is secured by a clamp plate 4, the latter is preferably formed at its ends with sockets 31 partially encircling the cylinders. The metal comprised in the sockets serves as a brace between the cylinders for reinforcing the same.

The hole through which one of the studs 14 passes is preferably elongated at 32 to provide the loose play necessary when the bar 12 is struck off center. This prevents breaking of the parts under such conditions. It may now be seen that, in the use of the device, the shock is absorbed by the two springs in proportion to its distribution above and below the center of the bar 12.

In the modification shown in Figure 2, the coil springs are replaced by a curved leaf spring 35 having its center bearing against the bracket 2 and its ends 36 engaging the ends of the bar 12. The ends 36 of the spring are preferably forked at 37 to straddle the webs 38, whereby the ends of the spring are definitely located. To locate and maintain the center of the spring, it is only necessary to form lugs 39 on the bracket 2 to engage opposite edges of the spring.

It will be seen that the shock absorbing bumper disclosed herein projects only a few inches beyond the position of the usual bumper guard. The shock absorbing cylinders are located between the bumper and the body of the vehicle where there is plenty of space for them.

Although specific embodiments of the invention have been illustrated and described, it will be understood that various alterations in the details of construction may be made without departing from the scope of the invention as indicated by the appended claims.

What I claim is:

1. In combination with the bumper bar of a motor vehicle, a shock absorbing bumper comprising a bracket secured thereto, guides formed at the ends of said bracket, a plunger slidably mounted on each guide, a shock bar crossing said bumper bar and joined to said plungers, spring means tending to move said bar away from said bracket and guides, and co-operating stops provided on said guides and plungers.

2. In combination with the bumper bar of a motor vehicle, a shock absorbing bumper comprising a bracket secured thereto, guides formed at the ends of said bracket, a plunger slidably mounted on each guide, a shock bar crossing said bumper bar and joined to said plungers and articulated at both ends to said plungers, spring means tending to move said bar away from said bracket and guides, and co-operating stops provided on said guides and plungers.

3. In combination with the bumper bar of a motor vehicle, a shock absorbing bumper comprising a bracket secured thereto, cylinders formed at the ends of said bracket, a plunger slidably mounted in each cylinder, a shock bar crossing said bumper bar and joined to said plungers, coil springs in said cylinders and bearing against said plungers to move said bar away from said bracket and cylinders, and co-operating stops provided on said cylinders and plungers.

4. In combination with the bumper bar of a motor vehicle, a shock absorbing bumper comprising a bracket secured thereto, cylinders formed at the ends of said bracket, a plunger slidably mounted in each cylinder, a shock bar crossing said bumper bar and articulated at both ends to said plungers, coil springs in said cylinders and bearing against said plungers to move said bar away from said bracket and cylinders, and co-operating stops provided on said cylinders and plungers.

5. In combination with the bumper bar of a motor vehicle, a shock absorbing bumper comprising a bracket secured thereto, cylinders formed at the ends of said bracket, a plunger slidably mounted in each cylinder, a shock bar crossing said bumper bar and joined to said plungers, coil springs in said cylinders and bearing against said plungers to move said bar away from said bracket and cylinders, co-operating stops provided on said cylinders and plungers, and means for adjusting the tension of said springs.

6. In combination with the bumper bar of a motor vehicle, a shock absorbing bumper comprising a bracket secured thereto, guides formed at the ends of said bracket, a plunger slidably mounted on each guide, a shock bar crossing said bumper bar and joined to said plungers, spring means tending to move said bar away from said bracket and guides, co-operating stops provided on said guides and plungers, and means for adjusting the tension of said spring means.

7. In combination with the bumper bar of a motor vehicle, a shock absorbing bumper comprising a bracket secured thereto, guides formed at the ends of said bracket, a plunger slidably mounted on each guide, a shock bar crossing said bumper bar and articulated at both ends to said plungers, spring means tending to move said bar away from said bracket and guides, co-operating stops provided on said guides and plungers, the articulation between said bar and one of said plungers being loose to permit play when said bar is tilted.

8. In combination with the bumper bar of a motor vehicle, a shock absorbing bumper comprising a bracket supported by and secured to said bar, a shock bar crossing said bumper bar and slidably supported by said bracket, and spring means tending to move said bar away from said bracket.

9. In combination with the bumper bar of a motor vehicle, a shock absorber comprising a bracket secured to said bar, a shock bar crossing said bumper bar and slidably supported by said bracket, spring means tending to move said bar away from said bracket, and means for adjusting the tension of said spring means.

10. A shock absorbing bumper comprising a bracket, cylinders formed at the ends thereof, a plunger slidably mounted in each cylinder, a shock bar joined to said plungers, spring means tending to move said bar away from said bracket and cylinders, co-operating stops provided on said cylinders and plungers, a clamping plate for securing said bracket to a bumper, and socket members formed at the ends of said plate to receive and reinforce said cylinders.

11. In combination with the bumper bar of a motor vehicle, a shock absorbing bumper comprising a bracket, cylinders formed at the ends thereof, a plunger slidably mounted in each cylinder, a shock bar joined to said plungers, spring means tending to move said bar away from said bracket and cylinders, co-operating stops provided on said cylinders and plungers, and clamping means securing said bracket to a bumper.

12. A shock absorbing bumper comprising a bracket, cylinders formed at the ends thereof, a plunger slidably mounted in each cylinder, a shock bar articulated at both ends to said plungers, spring means tending to move said bar away from said bracket and cylinders, co-operating stops provided on said cylinders and plungers, and clamping means for securing said bracket to a bumper.

13. In combination with a bumper bar of a motor vehicle, a shock absorbing bumper comprising a bracket, guides formed at the ends thereof, a plunger slidably mounted on each guide, a vertically mounted shock bar joined to said plungers, spring means tending to move said bar away from said bracket and guides, and clamping means securing said bracket to a bumper.

14. In combination with a bumper bar of a motor vehicle, a shock absorbing bumper comprising a bracket, guides formed at the ends thereof, a plunger slidably mounted on each guide, a vertically mounted shock bar articulated at both ends to said plungers, spring means tending to move said bar away from said bracket and guides, and clamping means securing said bracket to a bumper.

HARRY SCHREIBER.